Jan. 21, 1969     K. POPPER     3,423,310

OSMOTIC PROCESSES AND APPARATUS

Filed March 6, 1967     Sheet 1 of 3

KAREL POPPER
INVENTOR

BY R. Hoffman
ATTORNEY

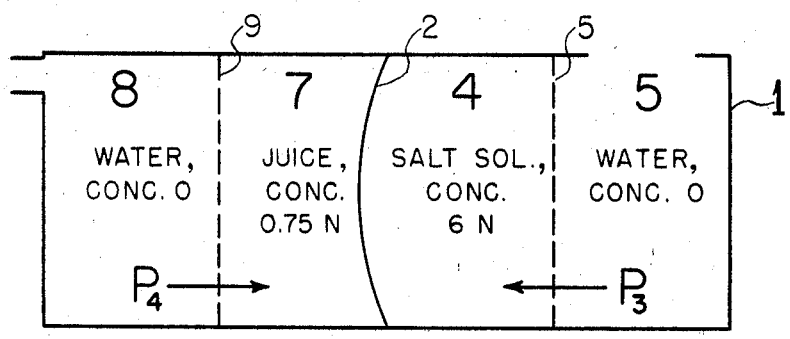
FIG. 3
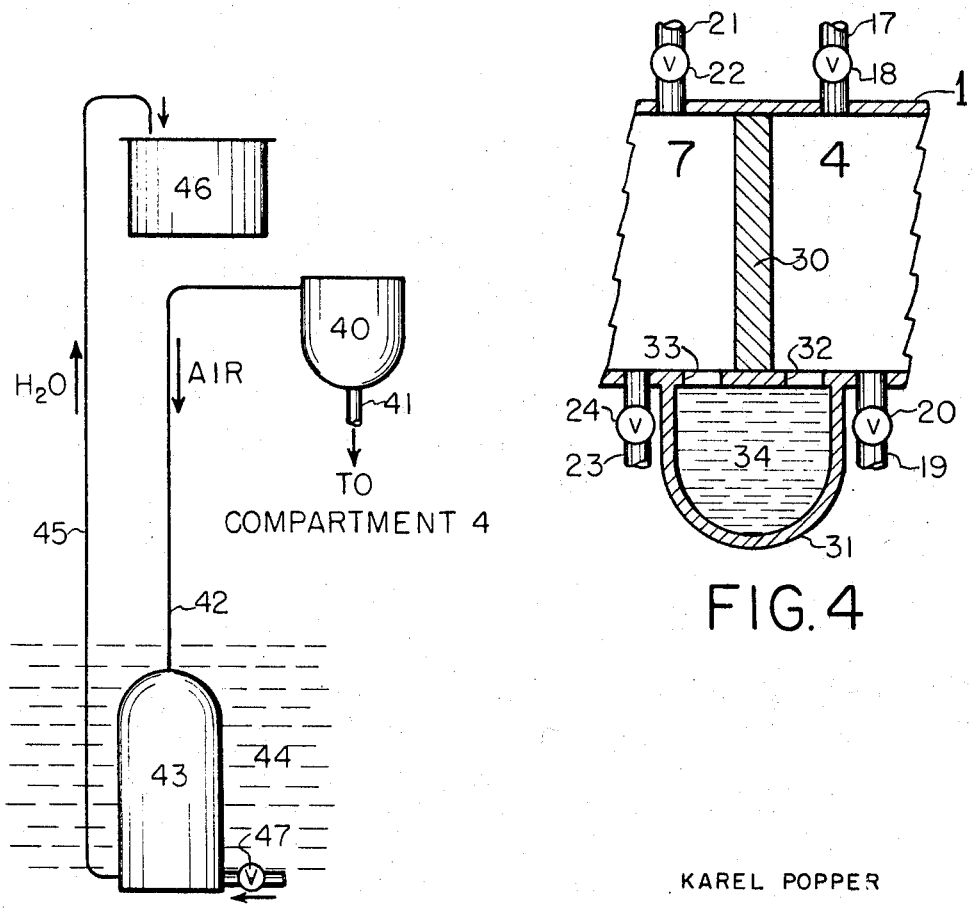
FIG. 4
FIG. 5
KAREL POPPER
INVENTOR
BY R. Hoffman
ATTORNEY

United States Patent Office 3,423,310
Patented Jan. 21, 1969

---

3,423,310
OSMOTIC PROCESSES AND APPARATUS
Karel Popper, Pleasant Hill, Calif., assignor to the United States of America as represented by the Secretary of Agriculture
Filed Mar. 6, 1967, Ser. No. 621,407
U.S. Cl. 210—23   3 Claims
Int. Cl. B01d *13/00*

---

ABSTRACT OF THE DISCLOSURE

A direct osmosis is conducted, for example, by juxtaposing a concentrated salt solution on one side of a membrane and water or dilute salt solution on the other. The osmotic pressure generated thereby is employed to drive a reverse osmosis operation, for example, one involving desalting of saline waters or one involving the concentration of liquid food products, such as juices. The transmission of pressure is attained without passage of the liquids through the use of a flexible diaphragm, a free piston, or a fluid piston.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel procedures and apparatus for conducting osmotic operations. Further objects of the invention will be evident from the following description wherein parts and percentages are by weight unless otherwise specified.

In the drawing:

FIGURE 3 is a diagram illustrating the action taking place in the apparatus of FIG. 1 when it is utilized, by way of illustration, in concentrating a juice.

FIGURE 4 is a cross-sectional view illustrating a modified form of the apparatus of FIG. 1.

FIGURE 5 is a schematic diagram illustrating auxiliary equipment which may be applied to the structure of FIG. 1 (or FIG. 4).

Figure 1:
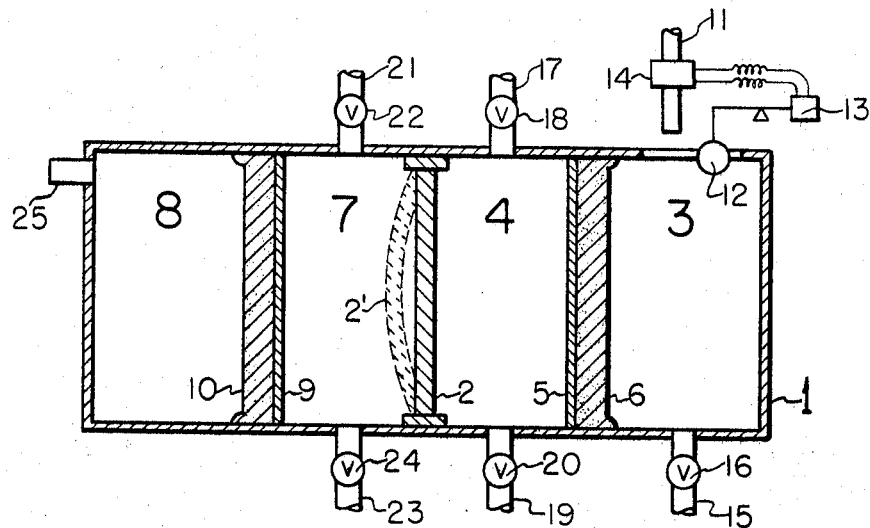
FIGURE 1 is a schematic view, in cross-section, of one embodiment of apparatus in accordane with the invention. Various parts, such as the membranes, are shown in exaggerated thickness for clarity of representation.

In carrying out an osmosis, a semi-permeable membrane is disposed in a vessel to divide it into two compartments and liquids are placed in each of the compartments. The arrangement of the membrane and the liquids on each side is commonly referred to as an osmotic cell. (Hereinafter the term "cell" will be understood to have this meaning. Also, the term "couple" is used herein to designate the pair of liquids in the system.) If, for example, a concentrated aqueous solution of salt (or any other soluble substance) is placed in one compartment (herein designated A), and plain water or a dilute aqueous solution of salt (or any other soluble substance) is placed in the other (compartment B), water will diffuse through the membrane from compartment B to compartment A. One may say that the flow of water is in the direction tending to equalize the concentration on both sides of the membrane. The process may be referred to as direct osmosis, to distinguish it from the reverse process hereinafter explained.

Also, the contact of the two solutions on either side of the membrane generates a force, termed the osmotic pressure. This pressure is the higher the greater is the difference between the concentrations of the liquids on either side of the membrane. More particularly, the osmotic pressure is directly proportional to the difference between (a) the number of dissolved particles per unit volume (or per unit weight) on one side of the membrane and (b) the number of dissolved particles per unit volume (or per unit weight) on the other side of the membrane. Since the normal system of denoting concentration provides a measure of the number of particles per unit volume, one can readily fined relative osmotic pressure in systems where the normality of the solutions is known. Thus, for example, a first cell containing 2 N sodium chloride solution on one side of the membrane and 1 N sodium chloride on the other side will exert an osmotic pressure 2 times that exerted by a second cell which contains, say 2.5 N potassium bromide solution on one side of the membrane and 2 N potassium bromide solution on the other side. Also as evident from the above example, the nature of the solutes is of no appreciable influence on the osmotic pressure.

It may be further noted that the osmotic pressure is not dependent on the rate at which diffusion of water takes place. It is thus evident that if, for example, a relatively concentrated aqueous solution of salt—or any other soluble substance—is placed in one compartment (designated A) of a cell, and plain water or a relatively dilute aqueous solution of salt—or any other soluble substance— is placed in the other (compartment B), and if compartment A is sealed, the continuing exertion of osmotic pressure will raise the pressure in compartment A until it reaches the osmotic pressure of the system, the level of this pressure being determined by the difference in concentration of the two liquids at that time. As an example of the degree of pressure involved it may be mentioned that a couple of sea water (about 3.5% dissolved solids) and plain water develops a pressure of about 360 lbs. per sq. in.

In accordance with the invention, osmotic pressure is utilized as a driving force to actuate another osmotic process, particularly one involving *reverse* osmosis.

To place the invention in proper focus, it may be well to explain what is meant by reverse osmosis:

Consider the cell described above wherein campartment A contains the concentrated solution, and compartment B contains water or the dilute solution. If a pressure sufficiently high to overcome the osmotic pressure is applied to the concentrated solution (and, of course, the membrane is protected from buckling or rupturing by a suitable porous backing structure), the flow of water can be reversed so that it diffuses through the membrane from compartment A to compartment B. In the known systems for conducting reverse osmosis the pressure required to overcome the osmotic forces and drive the diffusion in the reverse direction is secured by the use of pumps. It may be apropos at this point to note that the energy requirements for the pumping action are considerable, and with a relatively low-cost product (as in production of potable from saline water), the expense of pumping may render the whole process economically unfeasible.

Taking the above considerations into account, the invention is based on the new principle of utilizing osmotic pressure as a driving force to operate a reverse osmosis cycle. Thus for example, the invention encompasses a system wherein osmotic pressure is generated in a first cell (one involving direct osmosis) and this pressure is then utilized to drive a second osmotic cell (one involving reverse osmosis).

The invention is of great versatility and can be used for any separation procedures which can be performed osmotically. Typical applications of the invention are in the preparation of potable or industrially-usable water from saline sources such as sea water or brackish waters. The invention can be utilized for purifying waste waters discharged from industrial plants, e.g., spent brines from olive processing plants, effluents from the washing of salted hides, etc. Moreover, the invention can be utilized for the concentration of all types of liquid products such as fruit juices; vegetable juices; meat juices or extracts; juices and other liquid products derived from clams, fish, or other sea foods; lacteal products such as milk, whey, buttermilk, etc.; aqueous extracts of coffee, tea, cocoa, etc.; carbohydrate-containing liquids such as honey, molasses, maple sap or syrup, corn syrup, and juices or extracts obtained from sugarcane or sugar beets; animal blood; blood sera; juices or extracts of alfalfa, grasses, clover, soybeans, etc.; fermentation broths; liquid preparations containing vitamins or vitamin precursors, etc.

It is further to be emphasized that the first (direct) osmosis cell and the second (reverse) osmosis cell may or may not involve the same substance. Thus it is within the ambit of the invention to have the driving pressure created by osmosis applied to one material and to have this pressure applied to either the same or to a different material. For example, in desalinating sea water or other source of water containing salt, it is preferred to operate both the direct and reverse cells with brines. On the other hand, in utilization of the invention in concentrating fruit juices or other material of relatively high cost, it is preferred to operate only the reverse cell with the juice or other material which is to end up in the final product. The direct osmosis cell is operated with lower-cost materials such as a brine, or, if desired, with aqueous solutions of other inorganic salts. Many salts are known which are more soluble than ordinary salt (NaCl), for example, calcium chloride, sodium sulphate, calcium nitrate, sodium diacid phosphate, etc., and any of these can be used thus to provide a greater osmotic driving pressure which, as above mentioned, increases with a greater difference in concentration between the liquids on each side of the membrane, hence provides a greater driving force for the reverse osmosis cell. Particularly preferred are highly-soluble salts of polyvalent metals or acids which, of course, provide a greater number of actual particles per mole used than salts of monovalent metals and acids.

A special advantage of the invention is that the required osmotic pressure can be created by a direct osmosis cell utilizing very abundant and cheap liquids. Thus, for example, in many localities there co-exist saline waters of different solids concentrations. These can be employed in the direct osmosis cell to provide the necessary concentration difference, and consequently produce the osmotic pressure to drive the reverse cell.

Typical of such locations are areas around the Great Salt Lake in Utah where there are available concentrated brines containing about 20% dissolved solids and other more dilute brines containing about 0.3% dissolved solids. In the Dead Sea area there are available concentrated brines (about 20–23% dissolved solids) and also springs of brackish water (about 0.2% dissolved solids). Also, in various artesian wells in California and Arizona where there has been salt intrusion, one can withdraw from lower levels of the wells water of relatively high salt content, and from upper levels water of substantially less salt content. In various coastal localities, one can obtain sea water (containing about 3.5% dissolved solids, equivalent to about 0.6 N calculated as NaCl) and brackish waters from adjacent bayous or estuaries, which will contain a lesser concentration of salts, e.g., about 0.1 to 0.5% dissolved solids or about 0.015 to .07 N, calculated as NaCl. Any of these pairs of liquids as described above, or their equivalents, can be employed as a couple to yield, at minimum expense, the desired osmotic driving force. Moreover, in areas having suitable climatic conditions, the water higher in salt content may be further concentrated by solar evaporation in open ponds to provide (when used with the other water of lesser salt content) a couple which yields an especially high osmotic pressure.

Reference is now made to FIG. 1 which schematically depicts an embodiment of apparatus in accordance with the invention.

Vessel 1 is provided with a liquid-tight elastic diaphragm 2 which divides the vessel into two sections and prevents liquids—even when under pressure—from moving from one section to the other. One section of vessel 1 is subdivided into compartments 3 and 4, which together with interposed membrane 5 form a first cell employed for direct osmosis. Reference numeral 6 designates a porous backing member of sintered metal or the like which is provided to prevent buckling or rupture of membrane 5. Additional reinforcing structure may obviously be provided as necessary to support membrane 5 and backing member 6 against pressures encountered in operation. The other section of vessel 1 is subdivided into compartments 7 and 8, which together with interposed membrane 9 form a second osmotic cell. Porous backing member 10 is provided to support membrane 9 and it may be further reinforced with conventional structural members to support it and the membrane when exposed to operating pressures.

As membrane 9 (and 5 as well) one may use any of the known films which display semi-permeable properties and particulary those which have a high water/solute diffusivity ratio, in other words, those which exhibit a high permeability to water but a low permeability to solutes. Thereby water can flow through the membranes whereas the passage of solutes (e.g., dissolved salts, sugars, flavor components, etc., as may be present in the liquid under treatment) is prevented or at least impeded to a large degree. Various membranes which exhibit these properties are known in the art and described in the literature, for example: Reid and Breton, Jour. of Applied Polymer Science, vol. I, pp. 133–143; U.S. Patents 3,133,132 and 3,133,137; Morgan et al., Food Technology, vol. 19, pp. 52–54; K. Popper et al., Food Engineering, April 1966, pp. 102 and 104; and K. Popper et al., Nature, vol. 211, No. 5046, pp. 297–8.

For supplying liquid to compartment 3 there is provided a feed pipe 11. In operation it is generally desired to keep compartment 3 full and for this reason there is provided a conventional ball float 12, which, through switch 13, operates solenoid valve 14 as necessary to keep the compartment filled with liquid. For discharge of the contents of this compartment, there is provided pipe 15 and valve 16.

Compartment 4 is provided with feed pipe 17, feed valve 18, discharge pipe 19, and discharge valve 20.

Compartment 7 is provided with feed pipe 21, feed valve 22, discharge pipe 23, and discharge valve 24. In some modes of operating the device of the invention—for example, in utilizing it to concentrate juices or the like—the product of the operation is discharged from the system via pipe 23 and valve 24.

Compartment 8 is provided with an overflow pipe 25. In the usual mode of operation this compartment is maintained full of liquid (usually plain water). Additional water flowing into compartment 8 (from compartment 7) drains out via pipe 25. In some applications of the device, as in desalting saline waters, the water discharged via pipe 25 is the product of the operation.

EXAMPLE I

The operation of the device of FIG. 1 will now be explained in connection with its use, by way of example, for desalting a saline water source, namely, one of brackish character having a salt concentration of about 0.03 N. (The concentrations of the various liquids in the system are expressed in this example by their normality, based on NaCl. For example, the above-indicated figure means that the concentrations of salts in the brackish water is 0.03 N calculated as NaCl.)

The driving force for the desalting operation (the reverse osmosis) is provided, in this particular example, by a direct osmosis cell using a couple of sea water (0.6 N) and brackish water (0.03 N).

In starting the operation, discharge valves 16, 20, and 24 are closed and remain in that position during the production cycle.

Compartment 3 is filled with the raw material (brackish water) via feed pipe 11, and during the production cycle this compartment is kept full by the operation of float 12 as explained above.

Compartment 4 is filled via feed pipe 17 with water having a substantially higher salt concentration than that of the brackish water in compartment 3. Thus for filling into compartment 4 one may use ordinary sea water (salt concentration of sea water is about .6 N) since it is cheap and readily abundant. However, it is to be emphasized that in compartment 4 one can use any solution as long as the concentration of dissolved solids is sufficiently higher than the concentration of salts in the liquid of compartment 3 to provide an osmotic pressure high enough to overcome the pressure developed in the reverse cell.

After filling of compartment 4, valve 18 is closed so that the compartment is sealed.

Compartment 7 is filled, via pipe 21, with the same brackish water as fed into compartment 3. After filling, valve 22 is closed so that comparmtent 7 is sealed.

Compartment 8 is filled with plain water, or remains full of water from a previous run. (It may be noted at this point that the reason for adding water or keeping water in compartment 8 is simply that it is desirable to keep membrane 9 wet at all times.)

The system now provided with the various liquids proceeds at once to function. In the direct osmosis cell (compartments 3 and 4), water diffuses from the brackish water (in compartment 3) into the sea water (in compartment 4). Since the latter compartment is sealed the pressure therein rises and consequently diaphragm 2 is distended to the left. The new position, 2', of the diaphragm is illustrated schematically by the broken lines. This distension of diaphragm 2 transfers pressure to the liquid in compartment 7 whereby reverse osmosis takes place, water diffusing through membrane 9 into compartment 8 from which it overflows through pipe 25 and is collected as the product of the operation.

Figure 2:
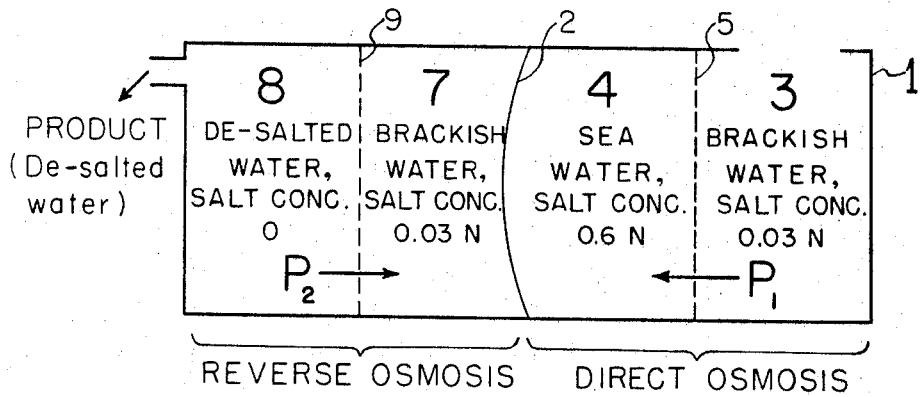
FIGURE 2 is a diagram illustrating the action taking place in the apparatus of FIG. 1 when it is employed, by way of example, for de-salting brackish water.

The operation is further explained by reference to FIG. 2, which illustrates the salt concentrations and pressures in the system. In the direct osmosis cell (compartments 3 and 4) the osmotic pressure is $P_1$ whereas in the reverse osmosis cell (compartments 7 and 8) the osmotic pressure is $P_2$. Pressure $P_1$ is necessarily greater than $P_2$ because the concentration difference in the direct cell is 0.57 unit (of normality) whereas in the reverse cell the concentration difference is only 0.03 unit. Accordingly, the back pressure $P_2$ is overcome by $P_1$ and the reverse osmosis is operative to cause water to flow out of compartment 7 through membrane 9 and into compartment 8, i.e., to achieve the desired end of producing a desalted water from a brackish source.

It is obvious that as the process proceeds, changes will occur in concentrations which will slow down the production of desalted water. For example, as the operation continues the liquid in compartment 4 will become dilute and the pressure $P_1$ will be reduced. Accordingly, when the rate of production falls off markedly the production cycle is terminated by dumping the contents of compartments 3, 4, and 7 (via pipes 15, 19, and 23). Then, these compartments are refilled as described above whereby the production cycle will be again resumed. No changes are required as to compartment 8.

It is obvious that the device of FIG. 1 may be equipped with equipment for automatically effecting the changeovers from production to discharge of spent liquors, refilling with fresh liquors, and back to production again. Accordingly, apparatus which incorporates such automated means is included within the broad compass of the invention. The following is an example of a modification to provide production on a continuous basis, interrupted only at short intervals for dumping and refilling: Feed valves 18 and 22 and discharge valves 16, 20, and 24 may be of the solenoid type, activated by a clock or pressure-sensing mechanism programmed to provide (1) operation for a period previously found to provide good results, then (2) dumping, (3) refilling, and (4) back to operation again.

EXAMPLE II

As another illustrative mode of utilizing the invention, the concentration (dewatering) of a fruit juice in the device of FIG. 1 will next be described.

In starting the operation, discharge valves 16, 20, and 24 are in closed position and kept closed during the production cycle.

Plain water is filled into compartment 3 via feed pipe 11, and during operation the compartment is kept full of water by operation of float 12 as previously described. (In this case, of course, pipe 11 is connected to a regular water main.)

Compartment 4 is filled with brine or, more preferably, a concentrated aqueous solution of a salt which is highly soluble in water. Typically, one may use calcium chloride, sodium sulphate, calcium nitrate, sodium diacid phosphate, etc. Especially preferred is an about 6 N solution of calcium nitrate which, in a couple with water, provides a very high osmotic pressure. After filling compartment 4, feed valve 18 is then closed to seal compartment 4.

Compartment 7 is filled with the juice—e.g., orange juice—which is to be concentrated. Feed valve 22 is then closed to seal the compartment. It may be noted that orange juice has a solids content of about 12%, or 0.75 N, calculated as glucose.

Compartment 8 is filled with water, or is full from a previous run.

In the direct osmosis cell, water diffuses from compartment 3 into the concentrated solution in compartment 4. The pressure so produced is transferred by diaphragm 2 to the juice in compartment 7 whereby water from the juice is caused to flow into compartment 8. As a result, the juice in compartment 7 becomes concentrated.

When production slows down—due, for example, to dilution of the solution in compartment 4—the concentrated juice is drained from compartment 7 as the product. The contents of compartment 4 is dumped. (The spent liquor may be evaporated for reuse.) To restart the production cycle, fresh juice is filled into compartment 7 and concentrated salt solution into compartment 4, as above described. No changes are required as to either compartments 3 or 8.

In an alternative mode of operation, when the solution in compartment 4 becomes so dilute that the rate of concentration of the juice slows down, the following plan can be used: The salt solution in compartment 4 is replaced without removal of the product from compartment 7. In this way the same batch of juice will be subjected to further concentration through the renewed pressure from the newly-established couple in compartments 3 and 4.

Valves operated by a clockwork may be provided as heretofore described, to provide continuous operation with only brief interruptions for discharge and refilling compartments 4 and 7.

The pressures and concentrations involved in this Example II, are illustrated in FIG. 3. In the direct osmosis cell (compartments 3 and 4) the osmotic pressure is $P_3$, whereas in the reverse osmosis cell (compartments 7 and 8) the osmotic pressure is $P_4$.

The pressure $P_3$ is greater than $P_4$ because the concentration difference in the direct osmosis cell is 6 normality units, whereas the concentration difference in the reverse osmosis cell is only 0.75 unit. Accordingly, the back pressure $P_4$ is overcome by $P_3$ and the reverse osmosis is operative to cause water to flow out of compartment 7 through membrane 9 into compartment 8, i.e., the desired result of dewatering (concentrating) the juice is achieved. It may further be observed that the pressure created by the direct osmosis cell is high enough to be effective even as the back pressure ($P_4$) rises due to increasing concentration of the juice in compartment 7. Thus even if the concentration of the juice rises to about 64% solids, equivalent to 4.85 N (calculated as glucose), the back pressure will be overridden by pressure $P_3$.

FIGURE 4 depicts a modification of the apparatus of FIG. 1 wherein the flexible diaphragm (2, in FIG. 1) is replaced by a solid inflexible barrier. To effect the desired transfer of pressure from the direct cell to the reverse cell there is provided a liquid piston.

Referring in particular to FIG. 4, inflexible barrier 30 divides vessel 1 into two sections so that liquid cannot pass from one section to the other. A dome 31 is provided to connect compartments 4 and 7 via ports 32 and 33. However, to prevent the passage of the solutions, dome 31 is filled with a liquid which is denser than water and which is immiscible with water so that any portion of the liquid displaced into compartments 4 and 7 during operation will not interfere with the osmotic processes and will flow back to the dome when pressures in the compartments are equalized (as in the dumping and refilling cycles). Typically, one may use such liquids as mercury, chloroform, carbon tetrachloride, etc. It is evident that the liquid, designated 34, acts as a liquid piston to attain the desired transfer of pressure.

It is further obvious that, alternatively, dome 31 (and the necessary ports opening into compartments 4 and 7) may be provided at the top of vessel 1 instead of at the bottom. In such case the liquid in the dome would be one which is less dense than water and which is immiscible with water. Typically, one would use in such case a glyceride oil such as cottonseed oil or a petroleum oil such as paraffin oil, kerosene, or the like.

Another plan for modifying the structure of FIG. 1 involves utilizing part of the pressure generated in the direct osmosis cell to pump liquids required for the continued operation of the system. Having reference to FIG. 5, a bell 40 is installed over vessel 1 and communicating via pipe 41 with compartment 4. During operation of the system, liquid from compartment 4 is forced partially into bell 40, compressing the air at the top thereof. This compressed air is directed by pipe 42 to a bell 43 immersed in the body of water 44 used in the process. Thereby the water is forced from bell 43 through pipe 45 to reservoir 46 located above vessel 1 so that gravity flow may be utilized for refilling the appropriate compartment of the osmotic system. Bell 43 is provided with a conventional one-way flap valve 47 so that in periods of discharge of compartment 4 (when pressure is released), water can run into and fill the bell. It is obvious that this lifting system can be applied to various liquids required in operation; for example, in de-salting operations it may be used to lift both the brackish water and the one higher in salt content. In such event the compressed air in pipe 42 is directed to two bells, one located within each water source, and with provision of appropriate piping to separate reservoirs. It is, however, to be observed that the lifting arrangement decreases the net pressure available for application to the reverse osmosis cell so that it is only suitable where sufficient excess pressure is available or where extra direct osmotic cells are set up especially for the water lifting operation.

Figure 6:
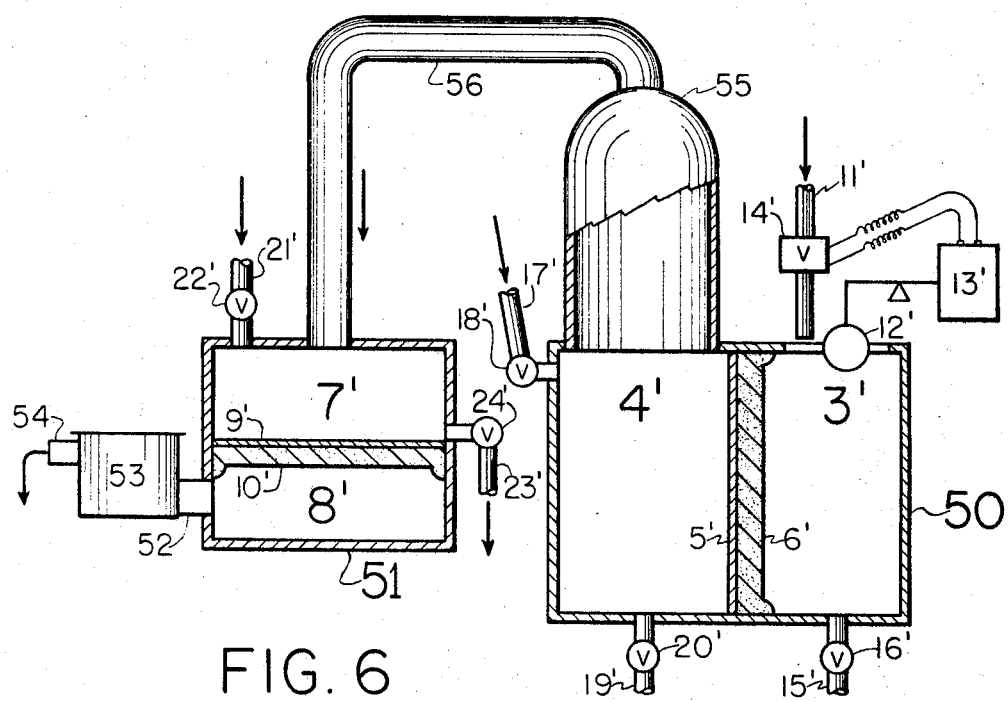
FIGURE 6 is a schematic diagram, partly in cross-section, of another modification of the apparatus of the invention, wherein the pressure transfer is effected by a gas piston.

Reference is now made to FIG. 6 which depicts an embodiment of the apparatus of the invention wherein the pressure transfer is effected by a gas piston. Note: In this figure, various parts which correspond to those in FIG. 1 are designated by the same reference numerals with a prime sign—e.g., the element denoted 3′ in the device of FIG. 4 corresponds to the element 3 in the device of FIG. 1.

The device of FIG. 6 includes vessel 50 for conducting the direct osmosis and vessel 51 for conducting the reverse osmosis.

Vessel 50 is subdivided by membrane 5′ and porous backing member 6′ into compartments 3′ and 4′, these being provided with the same appurtenances as above described for filling and emptying them.

Vessel 51 is subdivided by membrane 9′ and porous backing member 10′ into compartments 7′ and 8′. Compartment 7′ is equipped with the same appurtenances as above described for filling and emptying it. Water flowing into compartment 8′ (from compartment 7′) during a production cycle keeps this compartment (8′) full and excess is drained off via conduit 52, open-topped tank 53, and drain pipe 54.

A special feature of the device of FIG. 6 is the provision of dome 55 of large volume communicating with compartment 4′, and conduit 56 connecting the dome with compartment 7′.

During a production cycle, the air in dome 55 and conduit 56 acts as a gas piston to transfer the pressure generated in the direct osmosis cell (vessel 50) to the reverse osmosis cell (vessel 51). It is further evident that if desired for special purposes, gases other than air—e.g., nitrogen, nitrous oxide, helium, etc.—may be filled into dome 55 and conduit 56 by the provision of a pressured source of the desired gas and appropriate piping and valve arrangements.

Although the operation of the embodiment of FIG. 6 is believed obvious from the above description, it will be briefly explained below, having reference by way of example to the desalting of brackish water.

To start the production cycle discharge valves 16′, 20′, and 24′ are closed and kept closed during the production cycle. Compartment 3′ is filled with brackish water and kept full by the action of float 12′ as previously explained. Compartment 4′ is filled with sea water via pipe 17′ and feed valves 18′ is then closed. Compartment 7′ is filled with brackish water via pipe 21′ and then feed valve 22′ is closed. Compartment 8′ remains full of water from a previous run.

The system provided with the aforesaid liquids proceeds at once to function. Thus, water diffusing into compartment 4′ (from compartment 3′) increases the total volume of liquid which pushes upwardly into dome 55, compressing the air therein and forcing it through conduit 56 whereby it exerts pressure on the brackish water in compartment 7′. The exertion of the air pressure in this manner actuates the desired result of causing water (from compartment 7′) to diffuse through membrane 9′ into compartment 8′ from whence it is collected, as the desired product, via drain pipe 54.

The discharge and refilling cycles are performed as previously described. The liquid forced up into dome 55 during the production cycle drains back to compartment 4′ when the discharge cycle is being conducted and is removed with the remaining liquor of this compartment. It is, of course, obvious that the volume of dome 55 should be large enough that there will be no danger of liquid from compartment 4′ passing to compartment 7′.

Figure 7:
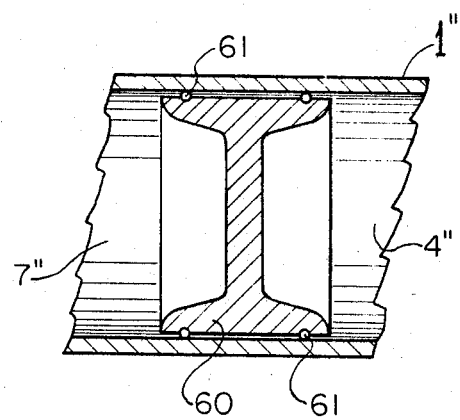
FIGURE 7 is a schematic diagram in cross-section of a modification of the apparatus of the invention, wherein the pressure transfer is effected by a free or "floating" piston.

FIGURE 7 represents a modification of the structure of FIG. 1 wherein the flexible diaphragm (2 in FIG. 1) is replaced by a free or "floating" piston. Referring to FIG. 7, reference numeral 1″ represents a vessel corresponding to vessel 1 of FIG. 1 except that in this instance the vessel (1″) is round in cross-section. Compartments 4″ and 7″ correspond to 4 and 7 in the device of FIG. 1. Between compartments 4″ and 7″ is located a free or "floating" piston 60, provided with O-rings 61 (or other sealing means to prevent passage of liquid). It is evident that increase in pressure in compartment 4″ is transferred to compartment 7″ to attain the desired effect.

Figure 8:
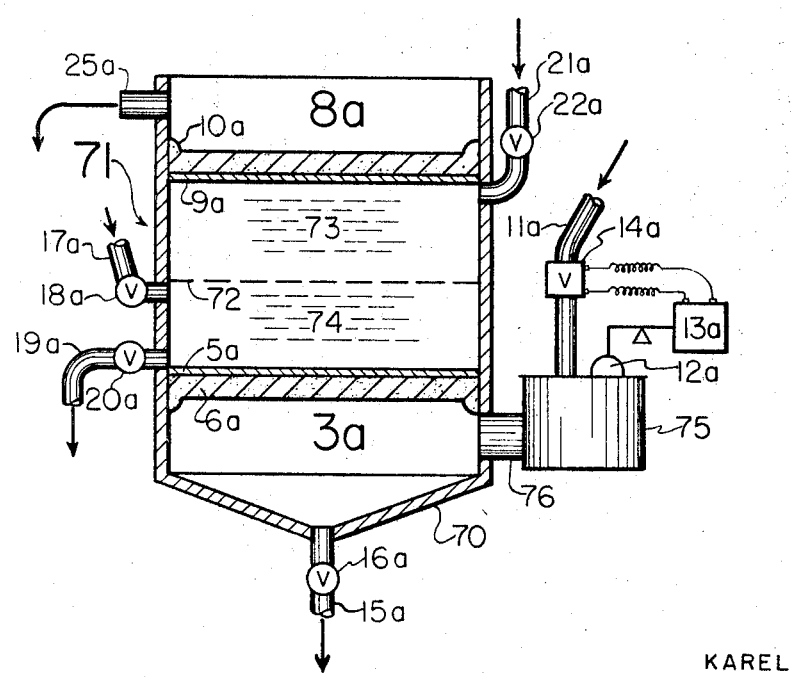
FIGURE 8 is a schematic diagram of a modification of the apparatus of the invention, wherein the pressure transfer is effected by the liquids under treatment.

Reference is now made to FIG. 8 which depicts an embodiment of the invention wherein the pressure transfer is effected directly by the liquids under treatment, and wherein density differences are utilized to minimize mixing. (Note: In the device of FIG. 8, various parts corresponding to those of the embodiment of FIG. 1 are designated by the same reference numerals but with an "a" appended. For example, the part designated in FIG. 8 as 3a corresponds to part 3 in the embodiment of FIG. 1).

Vessel 70 is provided with membrane 5a (supported by porous backing member 6a) across which direct osmosis takes place, and membrane 9a (supported by porous backing member 10a) across which reverse osmosis is effected. Bottom compartment 3a and top compartment 8a function as their counterparts 3 and 8, previously described.

The intermediate portion of vessel 70 (the space between membranes 5a and 9a, generally designated as 71) is not provided with any barrier. The broken line 72 simply represents the line of demarcation between an upper layer of liquid, designated 73, and a lower layer of liquid, 74.

In operating the embodiment of FIG. 8 in the desalting of brackish water, as an illustrative example, the following procedure is carried out:

Discharge valves 16a and 20a are closed and kept closed during the production cycle. Bottom compartment 3a is filled with brackish water, entering from feed pipe 11a, and flowing through open-topped tank 75 and conduit 76 into the compartment. During the production cycle, compartment 3a is kept filled with brackish water by the action of float 12a and associated mechanism, as previously explained. Top compartment 8a remains filled with desalted water from a previous run, and during the production cycle, water flowing thereinto through membrane 9a is discharged, as the product, via drain pipe 25a.

Sea water is fed into the middle compartment 71 via feed pipe 17a until it reaches the level represented by line 72, forming the body 74 of sea water in the compartment. Then feed valve 18a is closed.

Brackish water is then fed via feed pipe 21a into middle compartment 71—at a relatively slow rate to avoid mixing with the layer of sea water therein. When the remaining part of compartment 71 is filled, feed valve 22a is closed.

It is thus evident that there is provided in compartment 71 an upper layer 73 of brackish water, and a lower layer 74 of sea water. Since the latter is the denser of the two, the two layers remain in position with, at most, an insignificant degree of mixing at the interface between the layers.

So provided with the appropriate liquids, the system proceeds at once to function. As previously explained, the osmotic pressure developed across membrane 5a is sufficient to overcome the pressure developed across membrane 9a and so the system functions. The body of liquid 74, swelled by the influx of water (from compartment 3a), pushes upwardly on liquid 73 and forces water from this liquid (73) through membrane 9a into compartment 8a. Moreover, this excess of pressure is also more than enough to overcome the relatively small pressure exerted by the head or column of liquid established by the vertical arrangement of the compartments.

It is evident that as the production cycle continues, liquid 74 will become less dense and liquid 73 will become denser. However, this will not impede the operation because at the point when mixing may become significant, a substantial proportion of de-salted water will have been produced and the system will accordingly be due for discharge and refilling.

Having thus described the invention, what is claimed is:

1. A method for conducting a reverse omosis which comprises:
    (a) placing in osmotic relationship a first pair of liquids which exhibit a first difference in solute concentration,
    (b) placing in osmotic relationship a second pair of liquids which exhibit a second difference in solute concentration, said first difference being greater than said second difference, and
    (c) applying osmotic pressure generated by said first pair of liquids to said second pair of liquids by movement of a separate fluid which is in direct communication with one of the liquids of each pair of liquids to drive osmosis of the latter pair in the reverse direction.

2. The method of claim 1 wherein the separate fluid is a liquid.

3. Apparatus for conducting a reverse osmosis which comprises:
    (a) a first osmosis cell for treating a first pair of liquids,
    (b) a second osmosis cell for treating a second pair of liquids,
    (c) means for isolating said cells to prevent mixing of liquids therebetween, and
    (d) means for transmitting osmotic pressure generated in said first cell to said second cell, said transmitting means comprising a separate fluid contained within conducting means, said separate fluid being in contact with one of the liquids of each of said pair.

References Cited

UNITED STATES PATENTS 3,228,877  1/1966  Mahon _____ 210—321 X
3,344,926  10/1967  Barnabe et al. _____ 210—321

REUBEN FRIEDMAN, *Primary Examiner.*

F. A. SPEAR, JR., *Assistant Examiner.*

U.S. Cl. X.R.

210—321